US005609750A

United States Patent [19]
Nat et al.

[11] Patent Number: 5,609,750
[45] Date of Patent: Mar. 11, 1997

[54] BORON-CONTAINING CATALYST

[75] Inventors: Pieter J. Nat, Amersfoort; Jacob L. de Booys, Bussum; Johannes W. F. M. Schoonhoven, Leusden, all of Netherlands

[73] Assignee: Akzo Nobel NV, Arnhem, Netherlands

[21] Appl. No.: 233,209

[22] Filed: Apr. 26, 1994

Related U.S. Application Data

[62] Division of Ser. No. 892,090, Jun. 2, 1992, abandoned.

[30] Foreign Application Priority Data

Jun. 3, 1991 [NL] Netherlands .......................... 9100950

[51] Int. Cl.$^6$ .................. B01J 21/00; B01J 21/06
[52] U.S. Cl. .................. 208/122; 208/123; 208/124; 208/136; 502/202; 502/204; 502/206; 502/255
[58] Field of Search .................. 502/206, 257, 502/205, 202, 204, 255; 208/59, 122, 123, 124, 136

[56] References Cited

U.S. PATENT DOCUMENTS

| | | | |
|---|---|---|---|
| 2,888,501 | 5/1959 | Folkins et al. | 260/683.65 |
| 3,125,507 | 3/1964 | Tupman et al. | 208/216 R |
| 3,210,294 | 10/1965 | Chamitz | 252/453 |
| 3,954,670 | 5/1976 | Pine | 502/206 |
| 4,028,273 | 6/1977 | O'Hara | 502/204 |
| 4,062,809 | 12/1977 | Ward | 252/455 |
| 4,134,856 | 1/1979 | Itoh | 502/207 |
| 4,154,812 | 5/1979 | Sanchez et al. | 423/626 |
| 4,238,316 | 12/1980 | Mooi et al. | 502/254 |
| 4,439,312 | 3/1984 | Asaoka et al. | 208/216 PP |
| 4,829,040 | 5/1989 | Ward | 502/204 |
| 4,940,530 | 7/1990 | Kukes et al. | 208/89 |

FOREIGN PATENT DOCUMENTS

| | | |
|---|---|---|
| 0160475 | 11/1985 | European Pat. Off. . |
| 0325827 | 8/1989 | European Pat. Off. . |
| 7214647 | 12/1972 | Netherlands . |

OTHER PUBLICATIONS

"Testing of hds Catalyst in Small Trickle Phase Reactors", 6th Intl. Congress on Catalysis, London(1976), pp. 951–964. Author—de Bruijn.

*Primary Examiner*—Asok Pal
*Attorney, Agent, or Firm*—Joseph M. Noto; Louis A. Morris

[57] ABSTRACT

A catalyst composition for converting hydrocarbons in a hydrotreatment process (hydrodesulfurization and/or hydrodenitrogenization) and simultaneously cracking them, containing an alumina-silica-alumina carrier built up from alumina and silica-alumina, on which hydrogenation metals, such as molybdenum, nickel, and/or cobalt, have been provided and which also contains a catalytically active amount of boron, generally in the range of 1 to 20 wt. %. The invention also relates to a process for the preparation of such a catalyst, with boron being provided ahead of the Group VIII component. The carrier material used may be made up of mixtures of alumina and amorphous silica-alumina or of mixtures of alumina and silica-coated alumina. The catalyst composition is highly suitable for converting vacuum gas oil into middle distillate oils by hydrotreating.

22 Claims, No Drawings

BORON-CONTAINING CATALYST

This is a continuation of application Ser. No. 07/892,090 filed Jun. 2, 1992, now abandoned.

BACKGROUND OF THE INVENTION

1. Field of the Invention

The present invention relates to a catalyst which is suitable for selectively converting hydrocarbons in a hydrotreating process. More particularly, the invention relates to catalysts suitable for hydrodesulfurizing and/or hydrodenitrogenizing hydrocarbons while simultaneously cracking them.

2. Background

It is known that to enhance cracking activity such catalysts may contain an alumina-silica-alumina carrier built up from alumina and amorphous silica-alumina, on which there have been provided hydrogenation metals, e.g., molybdenum, nickel, and/or cobalt. Such catalysts are described in U.S. Pat. No. 4,238,316, which discloses catalysts containing 10–60 wt. % of alumina derived from boehmite or a mixture of boehmite and amorphous hydrous alumina and 40–90 wt. % of amorphous silica-alumina. In addition such catalysts may contain a small quantity of hydrogenation metals, e.g., tungsten, molybdenum, and nickel. This patent specification advises against the use of boron in such a quantity as might affect the catalytic conversion.

Alumina-silica-alumina-containing catalysts also can be employed to improve selectivity in hydrocarbon hydrotreating processes. Such is described in U.S. Pat. No. 4,062,809, which discloses the preparation of catalysts by mixing an alumina matrix with a silica-alumina cogel and adding thereto such hydrogenation metals as molybdenum, tungsten, nickel, and cobalt. Said catalysts display high selectivity, in particular when converting heavy oils into middle distillates.

SUMMARY OF THE INVENTION

The object of the catalysts according to the present invention is to achieve higher activity still both in the hydrotreating and the hydrocracking process. In particular, it is envisagized to improve the conversion as well as the denitrogenization and desulfurization activities without the selectivity being reduced in the process.

In accordance with the present invention in addition to a carrier built up from alumina and silica-alumina, a Group VIB hydrogenation metal, and a Group VIII hydrogenation metal, the catalyst contains a catalytically active quantity of boron. Preferably, the catalyst composition consists essentially of these components.

Employing a catalytically active quantity of boron generally means a quantity of 1 to about 20 wt. % of boron, calculated as the oxide on the catalyst's overall quantity by weight. However, these limits cannot be interpreted very strictly, since differences in catalyst composition, e.g., in the amount of alumina used, can lead to the utilization of different, also appropriate, quantities of boron. Preferably, the catalyst composition will contain 2 to 10 wt. % of boron, more particularly 4 to 8 wt. %, calculated on the catalyst's overall quantity by weight.

Other objects and advantages of the present invention will be apparent from the following detailed description of the invention, including the examples and appended claims.

The boron-containing compound used in preparing the catalyst of the invention may be e.g., $H_3BO_3$, $B_2O_3$ or organic boron compounds such as $B(OC_2H_5)_3$. It is preferred to use $H_3BO_3$. The compounds may be used either in the solid form or in solution.

If the carrier material is prepared by mixing alumina and silica-alumina according to one of the processes described hereinafter, the catalyst will display a high activity. The carrier material may be built up from a mixture of alumina and amorphous silica-alumina, but also from a mixture of alumina and silica-coated alumina. Whenever reference is made to silica-alumina in the description of the present invention, either silica-coated alumina or amorphous silica-alumina is meant. For use in the catalyst according to the present invention, it is preferred to employ mixtures of alumina and amorphous silica-alumina. Generally, suitable amorphous silica-alumina will contain 10 to 90 wt. % of silica, more particularly 20 to 90 wt. %. Preferably, use is made of amorphous silica-alumina containing 60 to 90 wt. % of silica.

If a carrier material of alumina and silica-coated alumina is employed, it is preferred for the silica-coated alumina to contain 10 to 20 wt. % of silica. The catalyst according to the invention contains about 5 to 60 wt. % of silica, calculated on the whole catalyst. Preferably, the catalyst will contain 10 to 50 wt. % of silica, more particularly 10 to 40 wt. %.

To attain satisfactory hydrotreating activity, it is preferred to provide such a quantity of a Group VIB metal and a Group VIII metal as will give a prepared catalyst containing in the range of 2 to 40 wt. % of the Group VIB metal and in the range of 0.5 to 10 wt. % of the Group VIII metal, both calculated as the metal oxides.

The Group VIB metal provided advantageously is molybdenum and/or tungsten, with notably an amount in the range of 5 to 30 wt. %, more particularly in the range of 5 to 20 wt. %, being likely to give favorable results. Eligible Group VIII metals include in particular nickel, cobalt or a combination thereof. The prepared catalyst preferably will contain 1 to 10 wt. % of such a metal or a combination of such metals, more particularly 2 to 8 wt. %. Highly favorable results are obtained when the catalyst contains 5 to 20 wt. % of molybdenum and 2 to 6 wt. % of nickel and/or cobalt, the amounts being calculated on the weight of the prepared catalyst.

Suitable catalysts according to the invention will generally have a pore volume in the range of 0.3 to 1.0 ml/g, preferably in the range of 0.35 to 0.80 ml/g, as determined by mercury porosimetry. The catalyst's surface area will generally be in the range of 100 to 400 m$^2$/g preferably in the range of 150 to 350 m$^2$/g, as determined by the BET nitrogen adsorption procedure. The median pore diameter to be selected will vary, depending on the feed to be treated, and generally is in the range of 30 to 300 Å, preferably in the range of 50 to 150 Å, as determined by mercury porosimetry.

The catalyst according to the present invention may be prepared employing conventional methods for preparing catalysts. It was found that favorable results are obtained if prior to the introduction of the Group VIII hydrogenation metal a calcination step is carried out. If use is made of several Group VIII metals, the most favorable result is always obtained when calcination takes place prior to the introduction of the entire quantity of Group VIII hydrogenation metals. Highly favorable results are obtained if boron or a boron-containing compound is provided ahead of the Group VIII hydrogenation component and at least one calcination step is carried out between the boron being added and the addition of the Group VIII metal. The calcination referred to may form the sole calcination step or, alternatively, be the first or last step or some intermediate step in a series of calcination steps. Calcining may be carried out either in air or in nitrogen, with, generally, temperatures in the range of 400° to 1000° C. being maintained for 0.5 to 16 hours. It is preferred to calcine in air.

It is possible to provide the boron either in the dry form by mixing or in solution by means of impregnation. Further suitable ways of adding the boron component are co-extrusion with (a portion of) the carrier material or co-impregnation with a solution containing a Group VIB metal component.

A very suitable way of providing the hydrogenation metals can be by means of impregnation with an appropriate metal-containing solution. Examples of suitable (water) soluble Group VIB compounds include molybdic acid, ammonium dimolybdate, and ammonium heptamolybdate. Also $MoO_3$ was found to be very suitable, notably in the case of the molybdenum being provided by means of copelletization and/or co-extrusion. As suitable water-soluble Group VIII metal compounds may be mentioned salts derived from strong acids, such as chlorides, nitrates, and sulfates, and salts derived from weak acids, such as acetates and carbonates. Also eligible are the metal hydroxides in question. Preference is given to nitrates and carbonates. Examples of such water-soluble compounds include $Ni(NO_3)_2$, $Co(NO_3)_3$, $Ni(CO_3)_2$, $Co(CO_3)_3$, and $CO_2(CO_3)_3$, with $Ni(NO_3)_2$ and $Co(NO_3)_2$ being preferred. In actual practice the carrier material will be subjected to a calcination step before impregnation is proceeded with. In the case of multiple impregnation the catalyst may be dried between times and, optionally, calcined. Alternatively, one or more of the hydrogenation metal compounds may be added to all or a portion of the not yet shaped carrier material in the dry form. A further alternative consists in the intimate mixture of one or more appropriate metal compounds with the carrier material during the shaping step. Procedures that can be used to this end are copelletization and co-extrusion. Preferably, calcining will always take place prior to the introduction of the Group VIII metal. More particularly, in the above processes there will be a calcination step between the boron being added and the addition of the Group VIII metal.

The carrier material can be prepared, int. al., as disclosed in U.S. Pat. No. 4,062,809. In general, the preparation of a suitable carrier material will comprise mixing alumina with amorphous silica-alumina in the dry or the hydrous form. Thus, e.g., it is possible to mix hydrated alumina, boehmite or pseudoboehmite with a homogeneous silica-alumina cogel, or to mix the alumina hydrogel with a graft copolymer of silica and alumina and then extrude the homogenized mixture. The resulting carrier material is built up from silica and alumina, with a portion of the alumina that is present having silica incorporated into the lattice.

The preparation of the alumina may be as in U.S. Pat. No. 4,154,812 which describes the preparation of a hydrated alumina by precipitating one or more aluminum salts, and then heating the alumina to dry the material. As suitable materials for the preparation of alumina may be mentioned boehmite, pseudoboehmite, and pseudoalumina. The preferred starting material for alumina is pseudoboehmite. A suitable procedure for preparing the amorphous silica-alumina is disclosed, int. al., in U.S. Pat. No. 3,210,294. A different method of preparation which is also suitable is given, int. al., in U.S. Pat. No. 4,238,316. It is preferred to prepare amorphous silica-alumina by means of coprecipitation of soluble silica and alumina compounds.

A different carrier material which is also suitable can be prepared by mixing alumina with a silica-coated alumina. For a description of the preparation of such a silica-coated carrier material, reference is made to EP-A 0160 475.

The sequence in which the catalyst components are to be added is subject to wide variation. Thus, the boron-containing compound may be mixed with precursor carrier material, e.g., boehmite. Alternatively, it is possible to mix said compound with the carrier material either before or during the shaping process. The boron-containing compound may be added to, say, a silica-alumina slurry and/or an alumina slurry, or be provided by means of co-extrusion. In each of these cases the carrier material may have been mixed with a Group VIB metal component or not. Depending on the catalyst's field of application, it may well be advisable to carry out an intermediate shaping step. According to another catalyst preparation method which is also suitable, the carrier is shaped, dried, and/or calcined prior to the addition of a boron-containing compound.

It is preferred to provide the hydrogenation metals as follows: first, the Group VIB metal is co-extruded with the carrier material; the product is shaped, and calcined, whereupon the shaped material is impregnated with the Group VIII metal. In such a preparative process boron is preferably added prior to the calcination.

It has been found that very favorable hydrotreatment and cracking processes for vacuum gas oil feeds can be carried out by using a catalyst of the invention prepared by mixing the Group VIB metal oxide in the dry form with the alumina in the dry form, mixing the resulting mixture with a boron-containing compound, and then adding a suitable amount of water-containing amorphous silica-alumina. In such a process the boron-containing compound may be added either in the dry form or in aqueous solution. The envisaged catalyst is finally obtained by adding the Group VIII metal by means of impregnation after shaping and calcining, and then calcining again. A suitable alternative method includes the boron compound being added to the hydrated alumina gel during or after its precipitation, followed by further processing as described above.

A highly suitable procedure for preparing the catalyst carrier was found to comprise mixing an alumina precursor, such as boehmite, with silica-alumina, $MoO_3$ and $H_3BO_3$, all in the powdered form, followed by the addition of a nitric acid solution and homogenizing to form an extrudable paste. Such a preparative process can very readily be followed by the shaping, drying, and calcining of the material, after which a Group VIII metal such as nickel is added to the resulting carrier by means of impregnation. Finally, the catalyst composition, having been dried or not, can be calcined.

The present catalyst is highly suitable for hydrotreating vacuum gas oil, displaying unexpected activity on all fronts: not only its desulfurization activity, but also its denitrogenization and cracking activity are found to be highly satisfactory if use is made of the catalyst of the present invention. Notably, the catalyst is found to display increased activity if it is used for the hydrotreatment of vacuum gas oils to form middle distillate oil. By vacuum gas oils are meant in particular those oils boiling in the range of 200° to 580° C. The term middle distillate refers to oils boiling in the range of 175° to 390° C.

Typical hydrotreating process conditions include temperatures between 300° and 450° C., hydrogen pressures between 25 and 200 bar, $H_2$:oil ratios between 150 and 1500 Nl/l, and space velocities ($hr^{-1}$) between 0.1 and 5.

The invention will be further illustrated with reference to the following non-limiting examples.

EXAMPLES

Example 1

Preparation of Catalyst A According to the Invention

A boric acid-containing solution was prepared by dissolving 167.5 g of $H_3BO_3$ in 30 ml of a 65%-nitric acid solution and 2260 ml of water at a temperature of 60° C. Meanwhile, 914 g of alumina (LOI=24.4%) were mixed with 203.5 g of molybdenum oxide powder. To this whole were added the aqueous solution of boric acid and 1013 g of amorphous silica-alumina (LOI=30.5%). The resulting mixture was shaped to form cylindrical extrudates of 1.5 mm in diameter and, after drying at 120° C. for 20 hours, the extrudates were calcined in an air atmosphere at 600° C. for one hour. The calcined extrudates were then impregnated with an aqueous solution of nickel nitrate; the product was dried and subsequently calcined at 600° C. for one hour. The resulting catalyst contained 4.8 wt. % of boric oxide, 11.2 wt. % of molybdenum oxide, 3.9 wt. % of nickel oxide, and 33.4 wt. % of silica, the remainder of the catalyst being made up of alumina. The surface area of the obtained catalyst A was found to be 301 $m^2/g$, and the pore volume, as determined by mercury porosimetry, was 0.58 ml/g. The average pore diameter was determined to be 72 Å, the pore volume of pores having a diameter greater than 36 Å being 0.54 ml/g and that of pores with a diameter greater than 200 Å being 0.027 ml/g.

Example 2

Testing

Catalyst A of Example 1 was tested in an isothermal pilot unit containing 100 ml of catalyst diluted with 100 ml of inert SiC chips (46 mesh) of the trademark Carborundum. This dilution was used to reduce backmixing. (A. de Bruyn, 6th *International Congress on Catalysis*, London (1976), p. 951.) Prior to its introduction into the reactor the catalyst was dried at 350° C. for one hour. The weight of 100 ml of catalyst after being dried at this temperature was 66 g. The catalyst was presulfided in the reactor with gas oil enriched with dimethyldisulfide according to generally accepted presulfiding procedures. The feedstock used was Kuwait vacuum gas oil analyzing as follows:

| | |
|---|---|
| sulfur | 2.9 wt. % |
| nitrogen | 900–1000 ppm |
| density (50° C.) | 0.900 kg/l |
| 5% BP (ASTM-1160) | 384° C. |
| 50% BP (ASTM-1160) | 451° C. |
| 95% BP (ASTM-1160) | 545° C. |

The testing conditions were as follows:

| | |
|---|---|
| feed rate (ml/hr) | 50 |
| $H_2$ pressure (bar) | 50 |
| $H_2$ oil ratio ($Nm_3/m_3$) | 320 |
| temperature (°C.) test I | 390 |
| temperature (°C.) test II | 407 |

The following results were obtained from two tests:

| | Test I (390° C.) | | Test II (407° C.) | |
|---|---|---|---|---|
| % desulfurization | 99 | 99 | 99 | 99 |
| % denitrogenization | 89 | 91 | 87 | 91 |
| % conversion to $C_{24}$-minus | 38 | 36 | 52 | 52 |
| % selectivity to $C_{11}$-$C_{24}$ | 81 | 81 | 78 | 76 |

The conversion to $C_{24}$-minus is defined as:

$$X=(D-B)/(1-B),$$

wherein

D=fraction of $C_{24}$-minus in product

B=fraction of $C_{24}$-minus in feed $C_{24}$-minus=hydrocarbons having a boiling point below that of n-$C_{24}$ paraffin (=392° C.), determined by means of gas chromatography (ASTM D-2887).

The selectivity to $C_{11}$-$C_{24}$ is defined as:

$$\frac{[100 \cdot (X-Y)]}{X}$$

wherein

X=$C_{24}$-minus conversion

Y=$C_{11}$-minus conversion, with $C_{11}$-minus and the $C_{11}$-minus conversion being determined in a manner analogous to that of the $C_{24}$-minus and $C_{24}$-minus conversion determinations, respectively.

COMPARATIVE EXAMPLE 3

Preparation of Comparative Catalyst B 1050 g of alumina (LOI=30.5%) were mixed with 200 g of molybdenum oxide powder. To this whole were added 936 g of amorphous silica-alumina (LOI=15%). The resulting mixture was shaped to form cylindrical extrudates of 1.5 mm in diameter and, after drying at 120° C. for 20 hours, the extrudates were calcined in an air atmosphere at 600° C. for one hour. The calcined extrudates next were impregnated with an aqueous solution of nickel nitrate; the product was dried and subsequently calcined at 600° C. for one hour. The resulting catalyst contained 4.0 wt. % of nickel oxide, 11.5 wt. % of molybdenum oxide, 33.6 wt. % of silica, and for the remainder was made up of alumina. The surface area of the obtained comparative catalyst B was found to be 314 $m^2/g$ and the pore volume, as determined by mercury porosimetry, was 0.59 ml/g. The average pore diameter was determined to be 78 Å, the pore volume of pores having a diameter greater than 36 Å being 0.53 ml/g and that of pores with a diameter greater than 200 Å being 0.057 ml/g.

Testing

Comparative catalyst B was tested under conditions identical with those given in Example 2. The following results were obtained from two tests:

| | Test I (390° C.) | | Test II (407° C.) | |
|---|---|---|---|---|
| % desulfurization | 98 | 98 | 98 | 98 |
| % denitrogenization | 76 | 80 | 81 | 81 |
| % conversion to $C_{24}$-minus | 30 | 34 | 47 | 50 |
| % selectivity to $C_{11}$-$C_{24}$ | 82 | 78 | 78 | 76 |

The above Examples show that, in addition to increased conversion, catalyst A according to the invention surprisingly provides improved denitrogenization and improved desulfurization in comparison with comparative catalyst B. Also unexpected is the very high selectivity to middle distillates ($C_{11}$–$C_{24}$). Although middle distillate selectivity is generally known to decrease as conversion increases, it was found that when use is made of the catalyst according to the invention, there is obtained, with increased conversion, at least the same selectivity.

The next Examples show that similar advantages are obtained when using catalysts according to the invention which contain cobalt instead of nickel as the Group VIII metal component.

Example 4

Preparation of Catalyst C According to the Invention

A boric acid-containing solution was prepared by dissolving 904 g of $H_3BO_3$ in a mixture of 641 g of a 65%-nitric acid solution and 14,000 ml of water at a temperature of 70° C. Meanwhile, 9080 g of aluminum oxide hydroxide (boehmite; LOI=25.7%) were mixed with 2170 g of molybdenum oxide powder. To this mixture there were added the aqueous boric acid-containing solution, 10,050 g of amorphous silica-alumina (LOI=17.9%), and 3800 ml of water. The resulting mixture was shaped to cylindrical extrudates of 1.5 mm in diameter and, after drying at 120° C. for 20 hours, the extrudates were calcined in an air atmosphere at 550° C. for one hour. 470 g of the so obtained extrudates were impregnated with an aqueous solution of cobalt nitrate; the product was dried and subsequently calcined at 530° C. for one hour. The resulting catalyst C contained 4.74 wt. % of boric oxide, 3.18 wt. % of cobalt oxide, 11.2 wt. % of molybdenum oxide, and 33.3 wt. % of silica, the remainder of the catalyst being made up of alumina. The surface area of catalyst C was 264 $m^2/g$ and the pore volume, as determined by $N_2$ desorption (77° K), was 0.54 ml/g. The average pore diameter, as determined by mercury penetration, was 87 Å, the pore volume of pores having a diameter greater than 36 Å being 0.54 ml/g and that of pores having a diameter greater than 200 Å being 0.049 ml/g.

Example 5

Preparation of Catalyst D According to the Invention

A boric acid-containing solution was prepared by dissolving 2739 g of $H_3BO_3$ in a mixture of 2314 g of a 65%-nitric acid solution and 15,000 ml of water at a temperature of 70° C. Meanwhile, 9400 g of aluminum oxide hydroxide (boehmite; LOI=26.0%) were mixed with 2274 g of molybdenum oxide powder. To this mixture there were added the aqueous boric acid-containing solution and 10,020 g of amorphous silica-alumina (LOI=15.2%). The resulting mixture was shaped to cylindrical extrudates of 1.5 mm in diameter and, after drying at 120° C. for 20 hours, the extrudates were calcined in an air atmosphere at 600° C. for one hour. 1725 g of the so-obtained extrudates were impregnated with an aqueous solution of cobalt nitrate; the product was dried and subsequently calcined at 530° C. for one hour. The resulting catalyst D contained 7.2 wt. % of boric oxide, 3.2 wt. % of cobalt oxide, 11.3 wt. % of molybdenum oxide, and 32.1 wt. % of silica, the remainder of the catalyst being made up of alumina. The surface area of catalyst D was 243 $m^2/g$, and the pore volume, as determined by $N_2$ desorption (77 K), was 0.47 ml/g. The average pore diameter, as determined by mercury penetration, was 76 Å, the pore volume of pores having a diameter greater than 36 Å being 0.43 ml/g and that of pores having a diameter greater than 200 Å being 0.033 ml/g. Example 6

Catalysts C and D from Examples 4 and 5, respectively, were tested under conditions identical with those given in Example 2. The following results were obtained.

|  | Catalyst C | | Catalyst D | |
| --- | --- | --- | --- | --- |
| Temperature (°C.) | 390 | 407 | 390 | 407 |
| % desulfurization | 99 | 99 | 99 | 99 |
| % denitrogenization | 88 | 85 | 88 | 84 |
| % conversion to $C_{24}$-minus | 39 | 53 | 37 | 49 |
| % selectivity to $C_{11}$-$C_{24}$ | 80 | 76 | 80 | 77 |

COMPARATIVE EXAMPLE 7

Preparation of Comparative Catalyst E

Comparative catalyst E was prepared in the same manner as described in comparative Example 3, except that in the impregnation solution employed the nickel nitrate was replaced by an equivalent amount of cobalt nitrate. The catalyst's surface area was 314 $m^2/g$ and the pore volume, as determined by mercury penetration, 0.59 ml/g; the average pore diameter was 78 Å, the pore volume of pores having a diameter greater than 36 Å being 0.53 ml/g, and that of pores having a diameter greater than 200 Å being 0.06 ml/g.

Testing

Comparative catalyst E was tested under conditions identical with those given in Example 2. The results are listed below.

| Test | I | II |
| --- | --- | --- |
| Temperature (°C.) | 390 | 407 |
| % desulfurization | 98 | 98 |
| % denitrogenization | 72 | 79 |
| % conversion to $C_{24}$-minus | 31 | 49 |
| % selectivity to $C_{11}$-$C_{24}$ | 80 | 77 |

We claim:

1. A catalyst composition for the hydrodesulfurization, hydrodenitrogenation and simultaneous hydrocracking of hydrocarbon feeds comprising a carrier material, a Group VIB metal component, a Group VIII metal component and a catalytically active quantity of boron, wherein said Carrier material comprises alumina and a silica-alumina, the silica-alumina being amorphous silica-alumina or silica-coated alumina and wherein the boron is not bound in a molecular sieve structure.

2. The catalyst composition according to claim 1, which contains from about 1 to about 20 wt. % of boron.

3. The catalyst according to claim 1 wherein said carrier material comprising alumina and amorphous silica-alumina contains in the range of about 60 to 90 wt. % of silica.

4. The catalyst according to claim 2 which contains 5 to 20 wt. % of Mo, 2 to 60 wt. % of Ni and/or Co, calculated as the metal oxides, from 10 to 40 wt. % of silica, and for the remainder alumina.

5. The catalyst according to claim 1 wherein the active surface area of the catalyst is in the range of 150 to 350 $m^2/g$, and the average pore diameter is in the range of 50 to 150Å.

6. The catalyst of claim 1 wherein the amount of boron present is effective to increase at least one of conversion, desulfurization activity and denitrogenization activity in a hydrotreating process without loss of selectivity.

7. A process for the preparation of a catalyst composition according to claim 1 including steps of mixing, shaping, and calcining the ingredients wherein the catalytically active quantity of boron is added ahead of the Group VIII metal component.

8. The process of claim 7 wherein at least one calcination step is carried out between the boron being added and the addition of the Group VIII metal component.

9. A catalyst prepared in accordance with the process of claim 7.

10. A catalyst prepared in accordance with the process of claim 8.

11. The catalyst composition according to claim 1 wherein the metal and boron components are present as the oxides.

12. The catalyst composition according to claim 1 wherein said silica-alumina is an amorphous silica-alumina.

13. A catalyst composition for the hydrodesulfurization, hydrodenitrogenation and simultaneous hydrocracking of hydrocarbon feeds consisting essentially of a carrier material, a Group VIB metal component, a Group VIII metal component and an amount of boron effective to increase activity and/or conversion without loss of selectivity, wherein said boron is not bound in a molecular sieve structure and wherein said carrier material consists essentially of alumina and a silica-alumina, the silica-alumina being amorphous silica-alumina or silica-coated alumina.

14. The hydrotreating catalyst of claim 13 which contains from about 1 to about 20 wt. % of boron, calculated as the oxide.

15. The hydrotreating catalyst composition according to claim 13 wherein the metal and boron components are present as the oxides.

16. The catalyst composition of claim 13 wherein said silica-alumina is an amorphous silica-alumina containing in the range of about 60 to 90 wt. % of silica.

17. A hydrotreating process including simultaneous hydrocracking comprising a step of contacting a hydrocarbon feedstock under hydrotreating conditions with a catalyst composition comprising a carrier material, a Group VIB metal component, a Group VIII metal component and an amount of boron effective to increase activity and/or conversion without a loss of selectivity, wherein said boron is not bound in a molecular sieve and wherein said carrier material comprises alumina and a silica-alumina, the silica-alumina being amorphous silica-alumina or silica-coated alumina.

18. The hydrotreating process of claim 17 wherein at least one of hydrodesulfurization activity and hydrodenitrogenization activity are increased.

19. The hydrotreating process of claim 17 wherein said feedstock comprises a vacuum gas oil and the product comprises a middle distillate oil.

20. The hydrotreating process of claim 17 which is carried out at temperatures between about 300° and 450° C., hydrogen pressures between about 25 and 200 bar, $H_2$:oil ratios between about 150 and 1500 Nl/l and space velocities ($hr^{-1}$) between about 0.1 and 5.

21. A catalyst composition for hydrodesulfurization, hydrodenitrogenation and simultaneous hydrocracking comprising a carrier material comprising alumina and amorphous silica-alumina, a Group IVB metal oxide component, a Group VIII metal oxide component and an amount of a boron oxide component effective to increase activity and/or conversion without loss of selectivity.

22. A catalyst composition for the hydrodesulfurization, hydrodrogenation, and simultaneous hydrocracking of hydrocarbon feeds, comprising a carrier material comprising alumina and a silica-alumina which is amorphous silica-alumina or silica-coated alumina, a Group VIB metal component, a Group VIII metal component and a catalytically active quantity of boron, which catalyst composition is prepared by a process including the steps of mixing, shaping, calcining, incorporating the group VIB metal component incorporating the group VIII metal component, and incorporating the boron.

* * * * *